3,226,235
METHOD OF HEATING WORT
Alan G. Williamson, Pepper Pike, Ohio, assignor to Canadian Breweries Limited, Toronto, Ontario, Canada
Filed Aug. 22, 1963, Ser. No. 303,765
1 Claim. (Cl. 99—52)

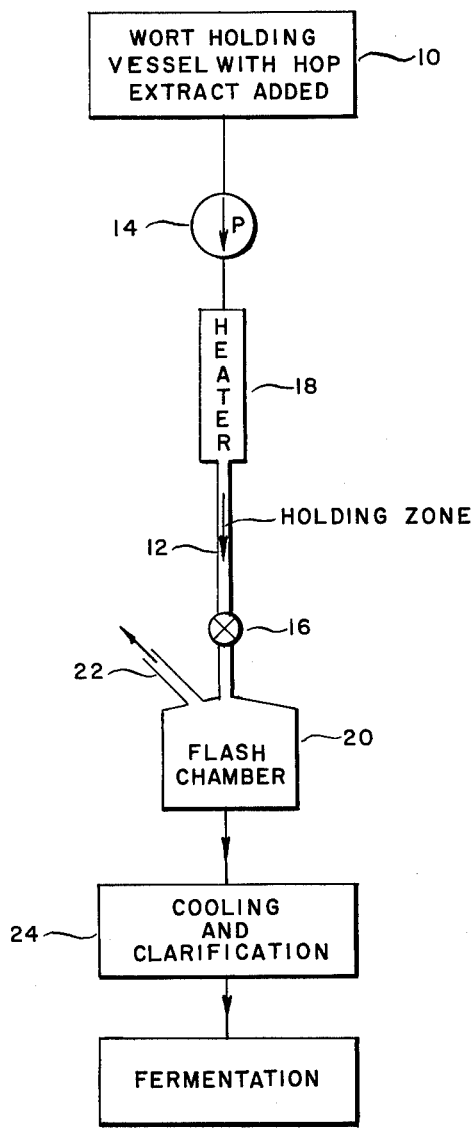

This invention relates to the heating of wort to achieve volatile boil off and protein break, and has special application to continuous wort production as distinct from batch wort production.

Wort for the making of beer and like beverages is boiled to at least partially remove undesirable volatile substances therefrom. It is also customarily hopped and in the boiling process conversion of alpha acids of the hop compounds takes place to yield isohumulons which give the beer its characteristic bitter taste.

Brewers have always experienced difficult in achieving quality control in the removal by boil off under atmospheric conditions of the unwanted wort volatiles. The old batch methods of boiling and hopping wort are quite unsuitable for modern continuous operation plants and satisfactory continuous methods capable of achieving a good quality control have not prior to this invention been developed.

The method of continuously heating wort according to this invention is characterized by the conduction of the wort to a holding zone wherein the temperature is raised by the addition of heat and the pressure is high enough to prevent evaporation; and the boiling off of the unwanted volatiles from the wort by flashing the wort from the holding zone to a flashing chamber having a pressure less than the holding zone by a predetermined amount to achieve the desired amount of boil off of unwanted volatile with said flashing.

Preferably, and in most cases, the temperature is raised high enough to achieve a protein break.

In cases where unconverted hop extract is added to the wort before it is conducted to the holding zone, the temperature and time duration in the holding zone should also be high enough to convert the alpha acids of the hop extract to isohumulons. The invention will be clearly understood after reference to the following detailed specification and the accompanying drawings.

In the drawing, the only figure is a schematic illustration of a wort processing method according to this invention.

Referring to the drawing, the numeral 10 refers to a wort holding vessel wherein wort is conveniently stored at temperatures in the neighbourhood of 140° F. to 180° F. Temperature in the holding vessel is not critical, but these temperatures are convenient for the process. Higher temperatures tend to cause wort coloration. Lower temperatures usually involve heat waste.

A hop extract is added to the wort in the wort-holding vessel for the purpose of giving the resulting beverage a bitter characteristic. The extract is made separately in a hop extraction zone and preferably in a buffered aqueous solution. It can, however, be made in a portion of the wort. The method of producing hop extract is not part of the process and is not referred to in detail in this specification. The extract will usually form 10 to 15% of the volume of the wort to which it is added, depending on the concentration of the extract.

The numeral 12 refers to a high temperature holding zone through which wort from the holding vessel 10 passes. Under the impulse of the pump 14 the pressure on the wort in the high temperature zone 12 is greater than atmospheric and is controlled by the pressure control valve 16. The temperature within the high temperature holding zone is between 240° F. and 312° F., as will be referred to later, and is controlled by means of the heater 18. Heater 18 is of standard construction in the chemical industry and consists essentially of a jacketed tube through which the wort flows with scrapper means for the heating tube surfaces.

The wort, on leaving the high temperature holding zone, is flashed through a pressure relief valve 16 into the flashing chamber 20, which in the embodiment of the invention illustrated is at atmospheric pressure and has a steam vent 22 to permit the boil off of unwanted wort volatile. Valve 16 is adjusted as indicated above to keep the pressure of the wort high enough to achieve a pressure drop at the flashing chamber that will give the required boil off.

Wort is conducted from the flashing chamber to the cooling and clarification zone 24, where it is cooled and where any protein precipitate that resulted from the heating in the high temperature holding zone is removed. Following cooling and clarification, it is fermented according to known processes.

The hop extract added to the wort in the holding vessel in advance of the high temperature holding zone is added for bittering value. It has alpha acids which must be converted to isohumulons to achieve this object, and the degree of conversion is controlled by the temperature and time in the holding zone. A temperature of 300° F. and a time interval of 31 seconds in the holding zone give a practically complete alpha acid conversion. Conversion of the hop extract also gives the required protein break. Throughput rate is a function of the equipment size for a given temperature holding time in the high temperature zone.

The evaporating of the unwanted volatiles from wort is achieved by release of heat from the pressure drop as the wort is released from the high temperature holding zone to the flashing chamber. The pressure in the high temperature holding zone is above atmospheric and must be high enough to prevent evaporation in the holding zone, which in turn would prevent the required temperature to be achieved. With a temperature of 300° F. a pressure of 75 pounds per square inch has been satisfactory.

When wort at 300° F. and 75 pounds per square inch pressure is flashed down to a flashing chamber at atmospheric pressure, the resulting evaporation is about 9% of wort volume. This achieves a workable and acceptable amount of evaporation of unwanted volatiles, but it can be increased by increasing the pressure differential be-between the high temperature holding zone and the flashing chamber or decreased by decreasing the pressure differential between the high temperature holding zone and the flashing chamber. The differential can be varied by changing the pressure in the holding zone or changing the pressure in the flashing chamber. It would, for example, be possible to operate the flashing chamber under partial vacuum to increase the evaporation of unwanted volatiles as a result of flashing.

The valuable thing about this method is that it permits the control of the amount of evaporation of wort volatiles by the very simple expedient of controlling pressure and temperature in chambers that lend themselves to such control.

It will also be apparent that if the flashing chamber 20 is operated under vacuum to increase evaporation, lower temperatures can be used in the holding zone, subject to the achievement of conversion of isohumulons.

In some cases converted hop extracts are produced in which the alpha acids are converted to isohumulons. With such extracts the addition to the wort can be made at the flashing chamber or subsequent to the flashing chamber because it is not necessary to convert them in the high temperature holding zone. In these cases the wort volatiles can be boiled off, in accordance with the above disclosure, without regard to hop conversion. The holding time for hop conversion is not a factor, and it is only necessary to raise the pressure in the holding zone sufficiently to give a required pressure drop on flashing for the necessary volatile boil off and preferably to raise the temperature sufficiently to achieve the required protein break.

Protein break conceivably could be achieved elsewhere in the process, but the above described holding zone is the most convenient place.

In cases where flashing is done at atmospheric pressure, the temperature will be of the order of 240° F. to 325° F. However, the process could be modified and the temperature reduced by flashing into a vacuum, provided that a sufficient differential of pressure between the holding zone and the flashing chamber is achieved to provide release of sufficient heat on flashing to result in the desired amount of wort volatile boil off. The temperature can be as low as will give the necessary protein break. It is well known in the art protein break can occur as low as 180° F., although it is preferred to achieve it through temperatures in the neighbourhood of 212° F. and higher.

What I claim as my invention is:

A method of continuously treating wort to achieve volatile boil off and hop conversion, comprising the steps of continuously mixing a stream of wort and a liquid unconverted hop extract, heating the said stream to a temperature of about 300° F. by heat exchange to the wort from a heat source exterior of the said stream of wort, continuing said stream at said temperature of about 300° F. for about thirty seconds to achieve a predetermined degree of conversion of alpha-acids to isohumulons, and evaporating unwanted volatiles from the wort by flashing to atmosphere.

References Cited by the Examiner

UNITED STATES PATENTS 2,555,938  6/1951  Seligman et al. _____ 99—52

FOREIGN PATENTS 625,837  8/1961  Canada.
879,470  10/1961  Great Britain.

A. LOUIS MONACELL, *Primary Examiner.*